(12) United States Patent
Batzler et al.

(10) Patent No.: US 9,461,468 B2
(45) Date of Patent: Oct. 4, 2016

(54) TRANSFER SWITCH WITH NEUTRAL DISCONNECT

(75) Inventors: Brandon Michael Batzler, Hartford, WI (US); Sie Teong Lim, Brookfield, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 878 days.

(21) Appl. No.: 13/235,965

(22) Filed: Sep. 19, 2011

(65) Prior Publication Data

US 2013/0070394 A1 Mar. 21, 2013

(51) Int. Cl.
*H02J 1/10* (2006.01)
*H02J 3/38* (2006.01)
*H02J 9/00* (2006.01)
*H02J 3/00* (2006.01)

(52) U.S. Cl.
CPC .................... *H02J 3/005* (2013.01)

(58) Field of Classification Search
USPC ...................... 307/23, 42, 64, 146
See application file for complete search history.

(56) References Cited

U.S. PATENT DOCUMENTS

| 7,692,332 B2 | 4/2010 | Nordman et al. |
| 7,737,579 B1 | 6/2010 | Czarnecki |
| 2009/0058191 A1* | 3/2009 | Nordman ................. H02G 3/08 307/112 |
| 2009/0084664 A1* | 4/2009 | Flegel ..................... H01H 9/26 200/50.32 |

* cited by examiner

*Primary Examiner* — Rexford Barnie
*Assistant Examiner* — Xuan Ly
(74) *Attorney, Agent, or Firm* — Andrus Intellectual Property Law, LLP

(57) ABSTRACT

A transfer switch panel including a bonded neutral connection to ground that allows the connection and disconnection of the utility neutral and an auxiliary power source neutral in one switching movement. The transfer switch panel includes a transfer switch connected to both a utility power source and an auxiliary power source. The transfer switch connects either the utility power source or the auxiliary power source to a pair of hot buses and a neutral bus contained within the transfer switch panel. The neutral bus includes a bonded connection to ground such that the neutral line of either the utility power source or the auxiliary power source is connected to ground when providing power to loads connected to a load center panel.

13 Claims, 4 Drawing Sheets

TRANSFER SWITCH WITH NEUTRAL DISCONNECT

BACKGROUND

The present disclosure generally relates to a transfer switch that is interconnected with both a utility power source and an auxiliary power source, such as an electrical generator, for controlling the supply of electric power from either the utility or the generator to electrical circuits in a home or business. More specifically, the present disclosure relates to a transfer switch that allows connection and disconnection of the neutral for the utility or generator for a whole house using the transfer switch.

Generators are used in a variety of different environments. For example, a generator can be used as an auxiliary or back-up power source for a building (e.g., a residence) or as the primary power source at a construction site. Numerous other uses for a generator are possible.

Bonding the neutral wire or line of the generator to ground is required in some environments. For example, the U.S. Occupational Safety & Health Administration ("OSHA") and the U.S. National Electrical Code ("NEC") require some generators to be neutral bonded, i.e., electrically connecting the neutral line of the generator to ground. Also, it may be required to include a ground-fault-circuit interrupt ("GFCI") in some generators for detecting ground-fault current.

A circuit breaker panel of a building or residence also typically has the neutral line bonded to ground. If a generator is connected to such a circuit breaker panel, a loop is created with the neutral line of the generator and the ground line of the circuit breaker panel. This potentially induces a current through the neutral and/or ground lines, or creates multiple paths to ground, which trips the GFCI of the generator or in the building.

Presently, many local jurisdictions require the neutral of a back-up generator to be switched, and thus completely isolated from the utility, during transfer of power supply from the utility to the generator during a loss of power. The requirement that neutral be switched falls in line with the requirement that line voltages must also be isolated during transfer between the utility and the generator. Presently, three-phase transfer switches are used to isolate the neutral in jurisdictions having this requirement. However, the cost of a three-phase switch can be an impediment to installing a back-up generator.

SUMMARY

The present disclosure relates to a transfer switch panel that can be operated to selectively connect a plurality of loads to either a utility power source or an auxiliary power source. The transfer switch panel includes a neutral bus having a bonded neutral connection to ground. The bonded neutral connection to ground for the neutral bus allows the neutral line of either the utility power source or the auxiliary power source to be connected to the bonded neutral upon movement of a transfer switch in the transfer switch panel.

The transfer switch panel includes the neutral bus and a pair of hot buses. The neutral bus and the pair of hot buses are connected to a transfer switch that includes a first switch set and a second switch set. The first switch set of the transfer switch includes a pair of hot switches and a neutral switch. The pair of hot switches are positioned between the hot lines from the utility power source and the hot buses contained within the transfer switch panel. The neutral switch of the first switch set is positioned between the neutral line of the utility power source and the neutral bus contained within the transfer switch panel.

The second switch set includes a pair of hot switches and a neutral switch. The pair of hot switches are connected between the hot lines from the auxiliary power source and the hot buses contained within the transfer switch panel. The neutral switch is positioned between the neutral line of the auxiliary power source and the neutral bus contained within the transfer switch panel.

When the first switch set is closed, the utility power source is connected to a utility load panel through the neutral bus and pair of hot buses contained within the transfer switch panel. When the second switch set is closed, the auxiliary power source is connected to the utility load panel through the neutral bus and the pair of hot buses. The transfer switch is configured such that either the first switch set or the second switch set is in the closed position to selectively connect either the utility power source or the auxiliary power source to the utility load panel.

The bonded connection between the neutral bus and ground within the transfer switch panel insures that the neutral line of the utility power source is connected to ground when power is being supplied by the utility power source. Likewise, when power is being supplied by the auxiliary power source, the neutral line of the auxiliary power source is connected to ground through a bonded connection. In this manner, the auxiliary power source can include a floating neutral which is connected to a bonded neutral when the auxiliary power source supplies power to the electric loads.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
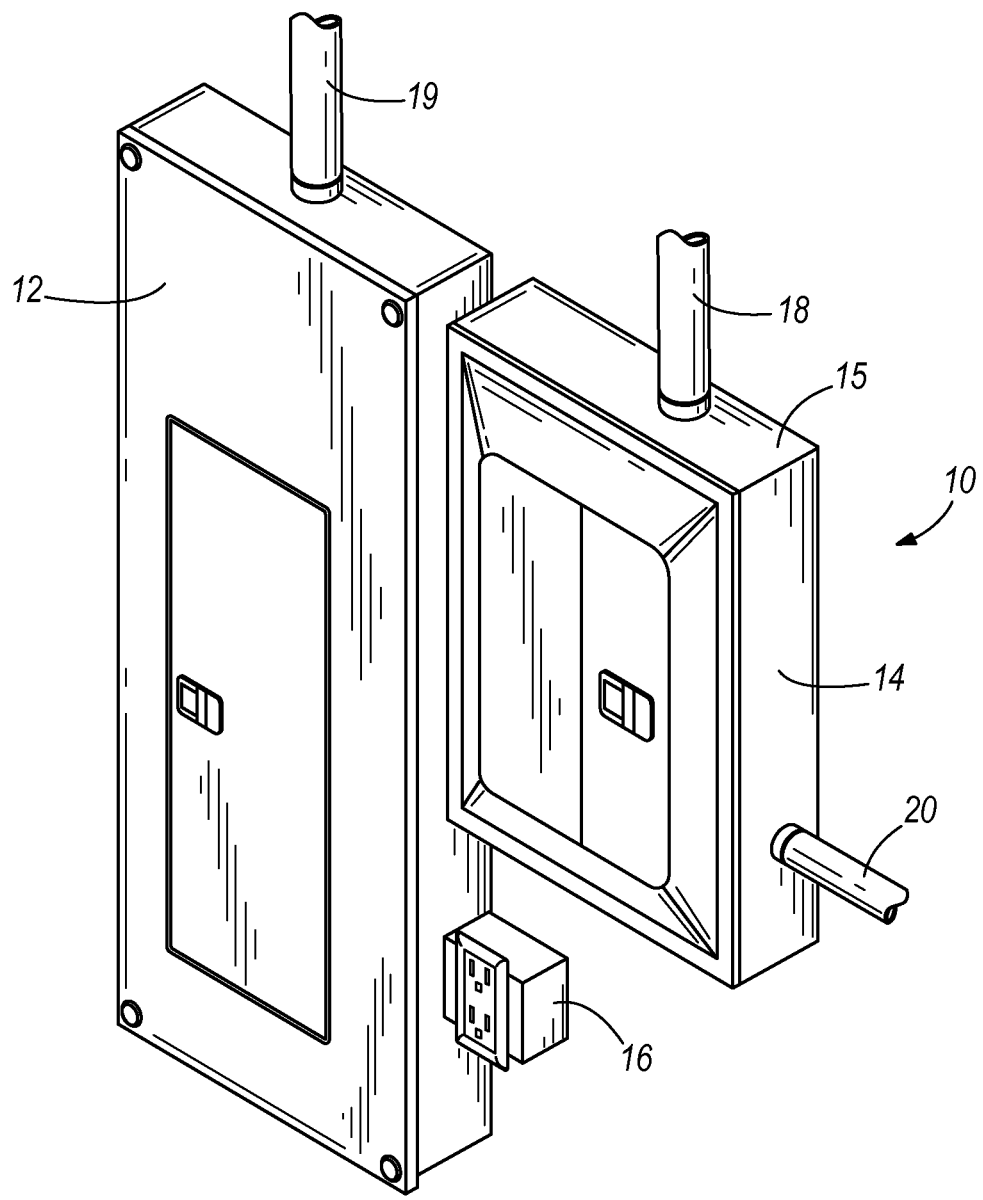
FIG. 1 illustrates a load center panel and a transfer switch panel according to an embodiment of the disclosure.

FIG. 1 illustrates a power distribution system 10 having a load center panel 12, a transfer switch panel 14, and an outlet 16. In some embodiments, as described in greater detail below, the power distribution system 10 can be implemented in a building (e.g., a residence, an apartment building, an office building, etc.) that is supplied with utility power via a utility service (e.g., a 100, 200, 400, or 600 amp service). Accordingly, the transfer switch panel 14 is supplied with utility power via conductors associated with a utility service ("utility lines") within a utility conduit 18. As used herein, the terms including conductor, line, wire, cable, and the like, refer generally to a conductive or semi-conductive medium that can be used to transmit current and/or voltage, as should be appreciated by one of ordinary skill in the art. Additionally, a "hot" conductor or line generally refers to a conductor that carries current to a component, while a neutral conductor or line generally refers to a conductor that provides a return path for current. Accordingly, hot and neutral conductors are also provided to, and returned from, various outlets, lights, and other appliances in the building through a conduit 19 leading from the load center panel 12.

In the embodiment shown in FIG. 1, the transfer switch panel 14 is positioned immediately adjacent to the load center panel 12, such that conductors can be fed directly from the load center panel 12 to the transfer switch panel 14. For example, as described in greater detail below, conductors associated with a transfer switch can be routed directly between the two panels 12 and 14. However, in some embodiments, the transfer switch panel 14 may be positioned remotely from the load center panel 12. Accordingly, conductors required between the load center panel 12 and the transfer switch panel 14 can be routed and protected via conduit. Generally, the load center panel 12 houses components (e.g., safety components such as fuses and/or circuit breakers, one or more bus bars, etc.) that control the state of circuits associated with appliances or components of the residence or other building.

The transfer switch panel 14 includes an outer housing 15 that houses a transfer switch (described below) that allow for switching between the utility power source and power from an auxiliary power storage and/or generating device (e.g., a generator, one or more batteries, etc.). The transfer switch panel 14 includes conductors that are associated with a generator, which are routed out of or into, the transfer switch panel 14 through a generator conduit 20. As used herein, the term "generator" means an apparatus or system that converts power or energy (e.g., mechanical, chemical, thermal, etc.) into electric power or energy. Accordingly, other power sources (e.g., power supplies powered by fuel cells or solar cells) and other generator types can be used in the power distribution system 10.

Figure 2:
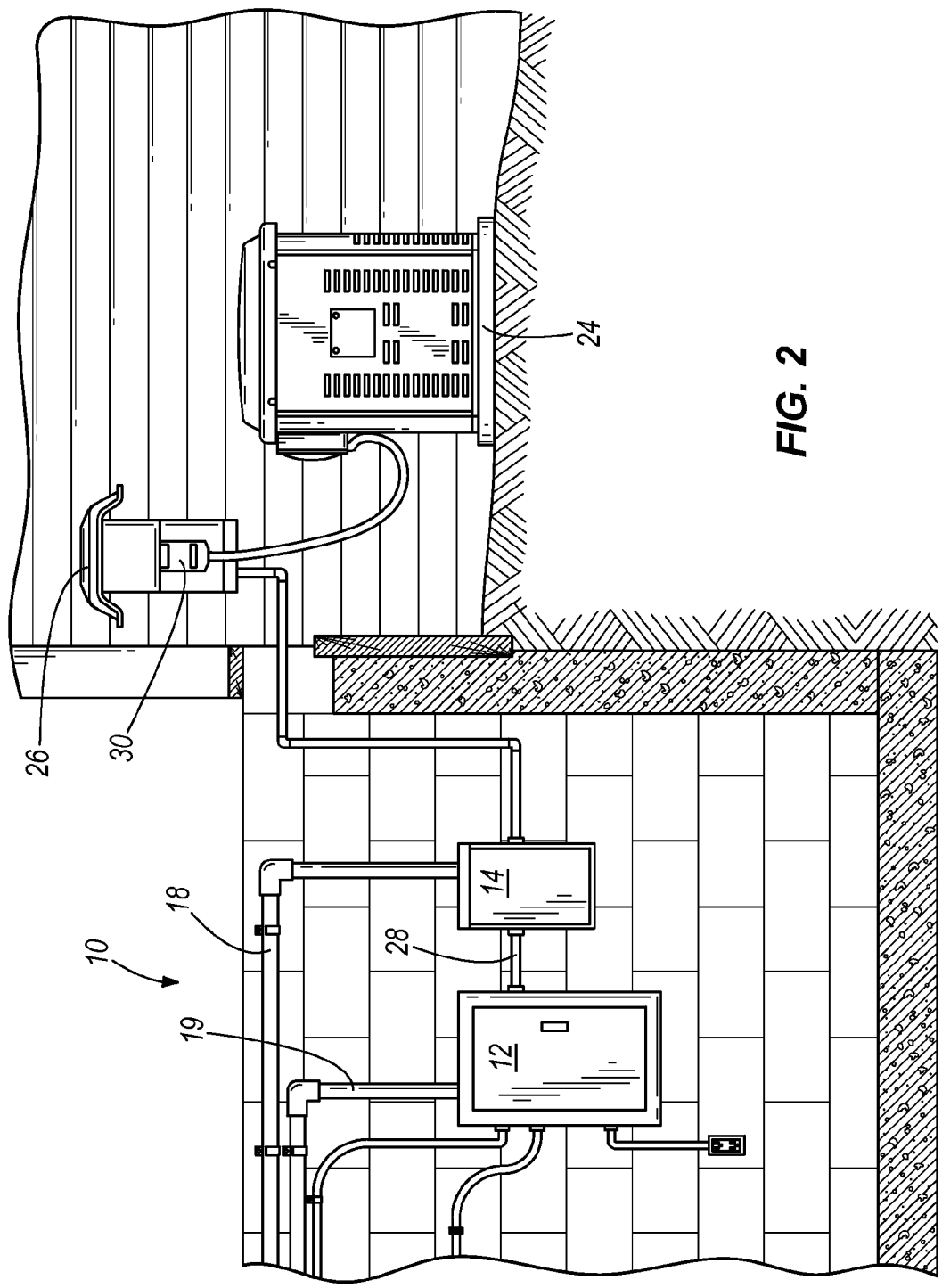
FIG. 2 illustrates the load center panel and transfer switch panel connected to a generator according to one embodiment of the disclosure.

FIG. 2 illustrates another view of the power distribution system 10. In some embodiments, the power distribution system includes the load center panel 12, the transfer switch panel 14, a generator 24, and a connection box 26. In other embodiments, the power distribution system 10 may include more or fewer components than those shown. For example, in some embodiments, connections can be made directly between the transfer switch panel 14 and the generator 24 directly (described below), thereby eliminating the need for the connection box 26. In the embodiment shown in FIG. 2, the power distribution system 10 is adapted to a residence.

Conductors associated with a utility service are routed through conduit 18 to the transfer switch panel 14. In the embodiment shown in FIG. 2, the transfer switch panel 14 and the load center panel 12 are positioned in a basement of the building. However, in other embodiments, the load center panel 12 may be positioned in an alternative location (e.g., on the main floor of a building).

Conductors are routed between the load center panel 12 and the transfer switch panel 14 within a conduit 28. For example, conductors associated with a utility service (e.g., one or more hot conductors, a neutral conductor, a ground conductor), as well as conductors associated with components of the residence or other building can be routed through the conduit 28 and the load center panel 12 to the transfer switch panel 14 through the conduit 28. In some embodiments, these conductors are associated with a transfer switch. In the embodiment shown in FIG. 2, the load center panel 12 and the transfer switch panel 14 are positioned relatively close to one another, thereby requiring a relative short section of conduit 28. However, in other embodiments, the load center panel 12 and the transfer switch panel 14 may be positioned further from each other. For example, the transfer switch panel 14 may be positioned in an alternative area of the building, thereby requiring a longer conduit 28.

The transfer switch panel 14 includes a transfer switch for transferring loads from the utility power source (being fed into the transfer switch panel 14) to the generator 24. In the embodiment shown, the generator 24 may be a relatively permanent generator. For example, the generator 24 may be a 1.5 KW to a 60 KW generator, depending on the number and power requirements of the essential devices. The size of the generator 24 could vary depending upon the energy requirements of the home or business it serves. Regardless of the size, the generator 24 generates electricity by conventional and known methods.

In some embodiments, the connection box 26 is positioned in a predetermined location that is relatively proximate to the generator 24, such as an exterior wall of the building. The connection box 26 allows hot, neutral, and ground conductors from the generator 24 to be connected to, and disconnected from, a transfer switch panel 14 relatively easily. For example, the conductors associated with the generator 24 can be connected to (and disconnected from) a receiving component included in the connection box 26 using a plug component 30. In some embodiments, the plug component 30 is a standard, four wire (e.g., two hot conductors, a neutral conductor, and a ground conductor), male-type, 240 volt plug, while the receiving component is configured to receive the plug component 30. The receiving component includes relatively permanent electrical connections with the conductors associated with the transfer switch that is housed in the transfer switch panel 14.

Figure 3:
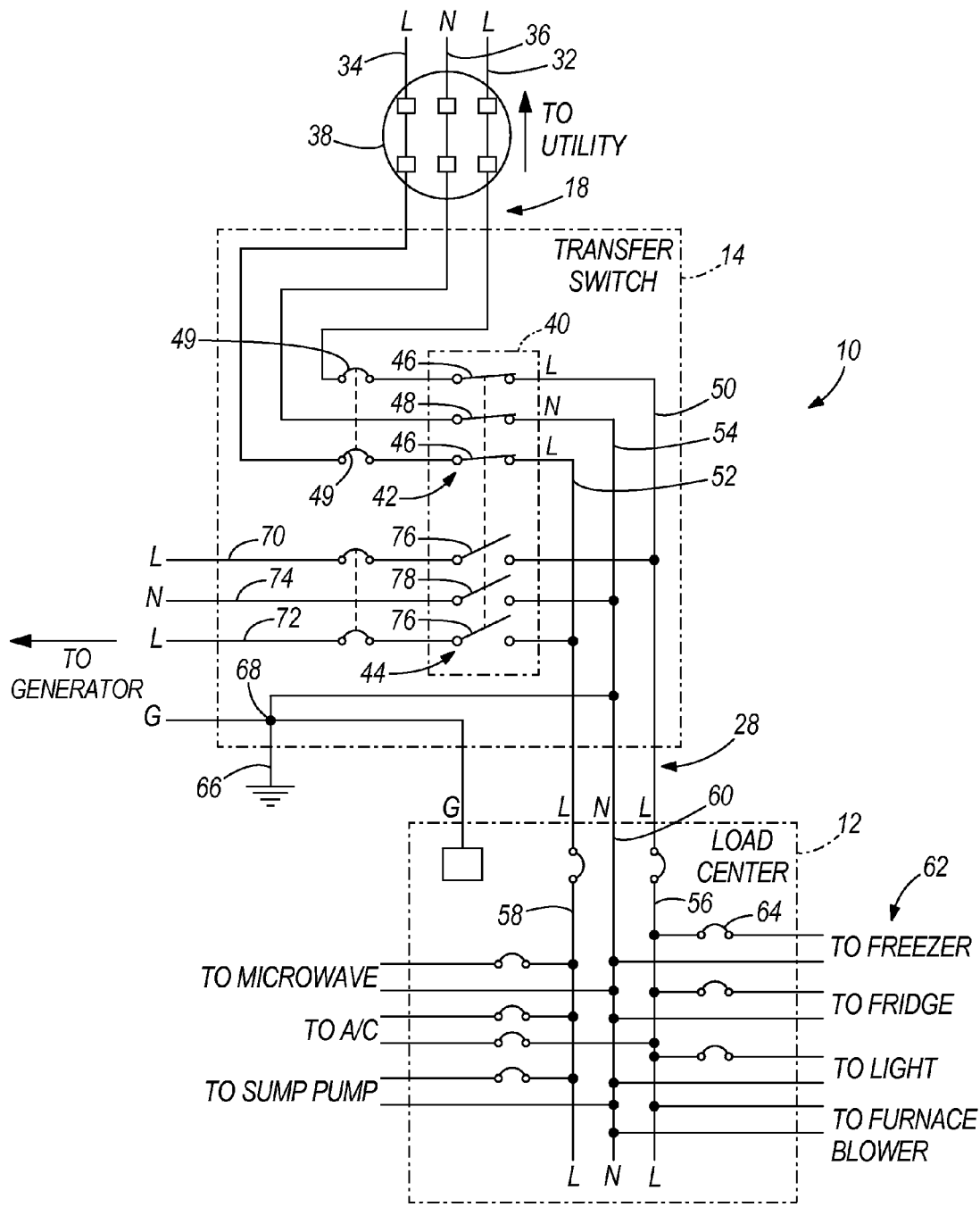
FIG. 3 illustrates the connection between the utility power source, the generator, the transfer switch panel and load center panel when power is being supplied by the utility.

FIG. 3 is a schematic illustration of the power distribution system 10 constructed in accordance with the present disclosure. As illustrated in FIG. 3, two hot lines 32, 34 as well as a neutral line 36 enter into the transfer switch panel 14 from the utility. In the embodiment shown in FIG. 3, the pair of hot lines 32, 34 and the neutral line 36 pass through a utility meter 38 before entering into the transfer switch panel 14. The hot lines 32, 34 and the neutral line 36 enter into the transfer switch panel 14 through the utility conduit 18.

The transfer switch panel 14 includes a transfer switch 40. The transfer switch 40 includes a first switch set 42 and a second switch set 44 that are configured to move together. The first switch set 42 includes a pair of hot switches 46 and a neutral switch 48. The hot switches 46 are each connected to one of the hot line 32, 34 while the neutral switch 48 is connected to the neutral line 36. In the embodiment illustrated in FIG. 3, a circuit breaker 49 is positioned on the supply side of each of the hot switches 46.

When the transfer switch 40 is in the first position, as shown in FIG. 3, the pair of hot switches 46 and the neutral switch 48 are in the closed condition such that the hot lines 32, 34 are connected to the pair of hot buses 50, 52 contained within the transfer switch panel 14. The neutral line 36 is likewise connected to neutral bus 54 contained within the transfer switch panel 14 through the neutral switch 48.

When the transfer switch 40 is in the first position shown in FIG. 3, the hot lines 32, 34 of the utility are connected to corresponding hot lines 56, 58 contained within the load center panel 12. Likewise, the neutral line 36 from the utility is connected to neutral line 60 contained within the load center panel 12. The hot lines 56, 58 and the neutral line 60 are each connected to one of a series of individual loads 62 contained within the home or business serviced by the load center panel 12. In the embodiment shown, each of the loads 62 is connected to one of the hot lines 56, 58 through a breaker 64 as is conventional.

As illustrated in FIG. 3, the neutral bus 54 of the transfer switch panel 14 is connected to ground at a bonded connection point 68. The bonded connection point 68 is a hard wired connection between the neutral bus 54 and ground 66 and is contained within the transfer switch panel 14. As illustrated in FIG. 3, the neutral line 60 contained within the load center is also connected to the bonded connection point 68 such that the neutral bus 54 of the transfer switch panel 14 and the neutral line 60 of the load center panel 12 each have a bonded connection to ground. Thus, the neutral bus 54 of the transfer switch panel and the neutral line of the load center panel are not floating and instead are bonded in a connection to ground.

In addition to the connection to the utility, the transfer switch panel 14 is also connected to an auxiliary power source, such as a generator, as illustrated in FIG. 3. The generator includes a pair of hot lines 70, 72 and a neutral line 74. The hot lines 70, 72 coming from the generator are connected to a pair of hot switches 76 of the second switch set 44 while the neutral line 74 is connected to a neutral switch 78 also of the second switch set 44. When the transfer switch 40 is in the first position shown in FIG. 3, the pair of hot switches 76 and the neutral switch 78 are in an open condition which disconnects the generator from the transfer switch panel 14.

When the utility is providing power, the transfer switch panel 14 remains in the first position shown in FIG. 3 such that power is supplied from the utility power source to each of the loads 62 connected to the load center panel 12. However, upon power interruption, the transfer switch 40 manually or automatically moves from the first position shown in FIG. 3 to the second position shown in FIG. 4. When the transfer switch is in the second position of the FIG. 4, the first switch set 42 moves to an open condition while the second switch set 44 moves to a closed condition. When the second switch set 44 is in the closed condition, the hot lines 70, 72 from the generator are connected to the hot buses 50, 52 contained within the transfer switch panel 14. At the same time the neutral line 74 is connected to the neutral bus 54 through the neutral switch 78. When the transfer switch 40 is in the second position shown in FIG. 4, electric power from the generator is supplied to the load center panel 12, and thus the electric loads 62.

Figure 4:
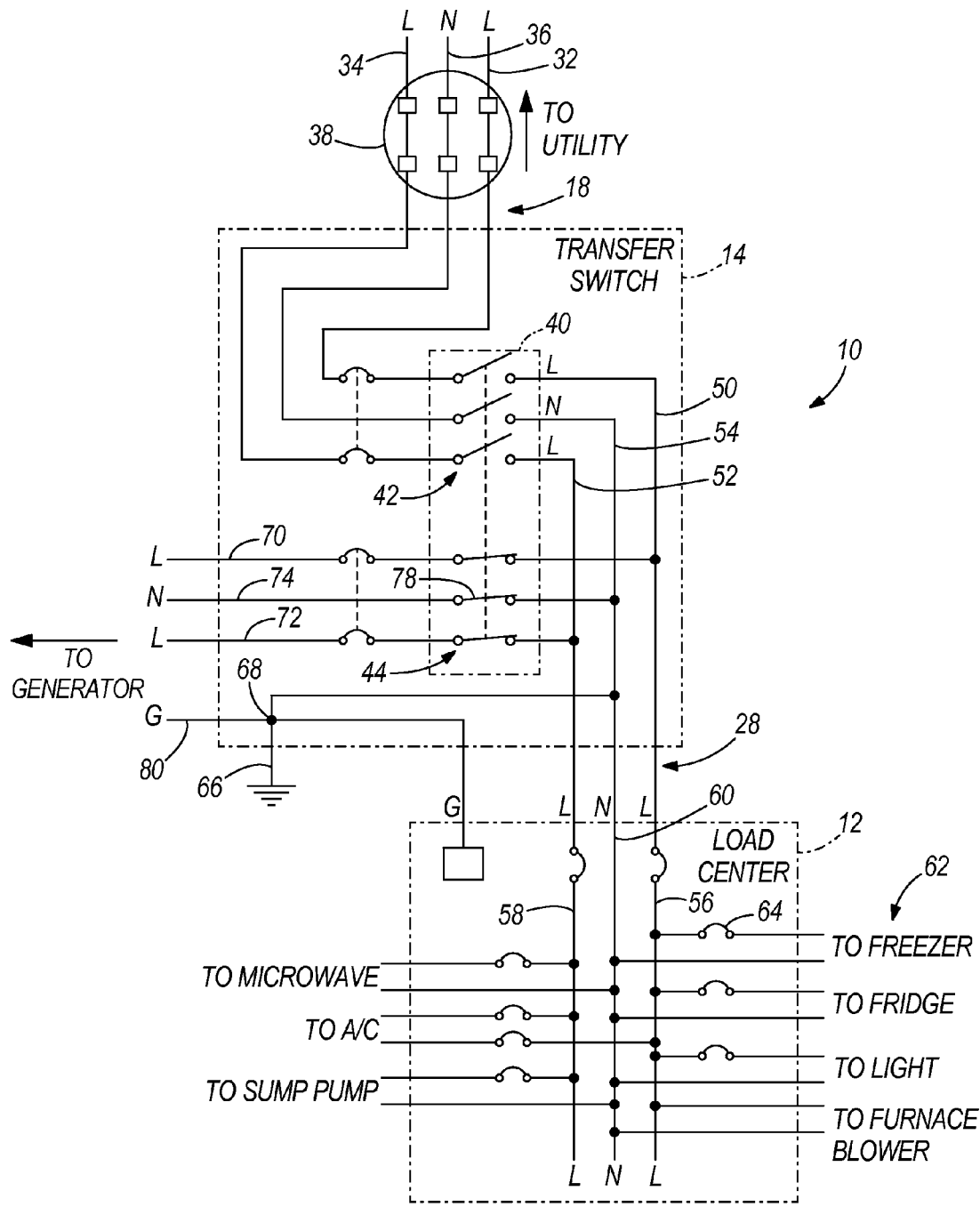
FIG. 4 is a view similar to FIG. 3 in which the transfer switch has been activated to supply power to the home by the generator.

When the second switch set 44 moves to the closed position shown in FIG. 4, the neutral line 74 corning from the generator is connected to the neutral bus 54 of the transfer switch panel 14. As previously described, the neutral bus 54 of the transfer switch panel 14 is connected to ground 66 through a bonded connection point 68. As illustrated in FIG. 4, the ground 80 from the generator is also connected to the bonded connection point 68. Thus, when the transfer switch 40 moves to the second condition shown in FIG. 4 to supply power to a home or business from the generator, the neutral line 74 of the generator is connected to ground at the bonded connection point 68. At the same time, the neutral line 36 of the utility is disconnected from ground such that the neutral of the utility is floating.

As can be understood by FIG. 4, the power distribution system 10 of the present disclosure allows the distribution system to be utilized with a generator that has a floating neutral. When the generator is connected to the load center panel 12, such as during an interruption in the supply of electricity from the utility, the neutral line 74 of the generator is connected to ground through the bonded connection point 68. In the embodiment shown in FIG. 4, the neutral bonding point or location is contained within the transfer switch panel 14 and is removed from the load center panel 12. In such an embodiment, the disconnect for the power distribution system 10 is contained within the transfer switch panel 14. Thus, the disconnect for the entire home is also contained within the transfer switch panel 14.

We claim:

1. A transfer switch panel that selectively connects a load center to either a utility power source or an auxiliary power source each having a pair of hot lines and a neutral line, comprising:

a neutral bus contained within the transfer switch panel, the neutral bus being bonded to ground within the transfer switch panel;

a pair of hot buses contained within the transfer switch panel;

a first switch set contained within the transfer switch panel and operable to selectively connect the pair of hot lines and the neutral line of the utility power source to the neutral bus and the pair of hot buses in a first position and disconnect the neutral line of the utility power source from the neutral bus in a second position;

a second switch set contained within the transfer switch panel and operable to selectively connect the pair of hot lines and the neutral line of the auxiliary power source to the neutral bus and the pair of hot buses in a first position and disconnect the neutral line of the auxiliary power source from the neutral bus in a second position wherein the first switch set includes a pair of hot switches and a neutral switch, wherein the neutral switch of the first switch set is positioned between the neutral line of the utility power supply and the neutral bus, wherein the second switch set includes a pair of hot switches and a neutral switch, wherein the neutral switch is positioned between the neutral line of the auxiliary power source and the neutral bus, wherein the pair of hot switches and the neutral switch of the first switch set move together and the pair of hot switches and the neutral switch of the second switch set move together; and a service disconnect breaker positioned within the transfer switch panel and positioned between the pair of hot lines from the utility power source and the first switch set.

2. The transfer switch panel of claim 1 wherein the auxiliary power source is a generator and the neutral line of the generator is connected to ground through the second switch set and the neutral bus.

3. The transfer switch panel of claim 1 further comprising an enclosed housing that surrounds the neutral bus, the pair of hot buses, the first switch set and the second switch set.

4. The transfer switch panel of claim 1 wherein the first and second switch sets move in unison with each other.

5. The transfer switch panel of claim 1 wherein the pair of hot buses and the neutral bus exit the panel for connection to a load center panel.

6. The transfer switch panel of claim 1 wherein the first switch set and the second switch set are configured such that either the utility power source or the auxiliary power source is connected to the neutral bus and the pair of hot buses at any time.

7. A power distribution system for providing power to a plurality of loads from either a utility power source or an auxiliary power source each having a pair of hot lines and a neutral line, comprising:

a transfer switch panel connected to both the utility power source and the auxiliary power source, wherein the transfer switch panel receives a pair of hot lines and a neutral line from the utility power source and a pair of hot lines and a neutral line from the auxiliary power source;
a neutral bus contained within the transfer switch panel, the neutral bus being bonded to ground within the transfer switch panel;
a pair of hot buses contained within the transfer switch panel;
a first switch set contained within the transfer switch panel including a pair of hot switches and a neutral switch, the first switch set being operable to selectively connect the pair of hot lines and the neutral line of the utility power source to the neutral bus and the pair of hot buses in a first position and disconnect the neutral line of the utility power source from the neutral bus in a second position;
a second switch set contained within the transfer switch panel including a pair of hot switches and a neutral switch, the second switch set being operable to selectively connect the pair of hot lines and the neutral line of the auxiliary power source to the neutral bus and the pair of hot buses in a first position and disconnect the neutral line of the auxiliary power source from the neutral bus in a second position, wherein the pair of hot switches and the neutral switch of the first switch set move together and the pair of hot switches and the neutral switch of the second switch set move together, wherein the first switch set and the second switch set are configured such that either the utility power source or the auxiliary power source are coupled to the neutral bus and the pair of hot buses;
a load center panel positioned to receive the neutral bus and the pair of hot buses from the transfer switch panel, wherein the load center panel is connected to a plurality of electrical loads; and
a service disconnect breaker positioned within the transfer switch panel and positioned between the pair of hot lines from the utility power source and the first switch set.

8. The system of claim 7 wherein the auxiliary power source is a generator and the neutral line of the generator is connected to ground through the second switch set and the neutral bus.

9. The system of claim 7 wherein the transfer switch panel further comprises an enclosed housing that surrounds the neutral bus, the pair of hot buses, the first switch set and the second switch set.

10. The system of claim 7 wherein the pair of hot buses and the neutral bus exit the panel for connection to a load center panel.

11. A transfer switch panel for selectively connecting either a utility power source or an auxiliary power source to a load center panel, wherein both the utility power source and the auxiliary power source have a pair of hot lines and a neutral line, comprising:
a neutral bus contained within the transfer switch panel, the neutral bus being bonded to ground within the transfer switch panel;
a pair of hot buses contained within the transfer switch panel, wherein the pair of hot buses and the neutral bus are connected to the load center panel;
a first switch set including a pair of hot switches and a neutral switch selectively positionable to connect the pair of hot lines and the neutral line of the utility power source to the neutral bus and the pair of hot buses in a first position and disconnect the neutral line of the utility power source from the neutral bus in a second position;
a second switch set including a pair of hot switches and a neutral switch selectively positionable to connect the pair of hot lines and the neutral line of the auxiliary power source to the neutral bus and the pair of hot buses in a first position and disconnect the neutral line of the auxiliary power source from the neutral bus in a second position, wherein the pair of hot switches and the neutral switch of the first switch set move together and the pair of hot switches and the neutral switch of the second switch set move together, wherein the first switch set and the second switch set are configured such that either the utility power source or the auxiliary power source are coupled to the neutral bus and the pair of hot buses; and
a service disconnect breaker positioned within the transfer switch panel and positioned between the pair of hot lines from the utility power source and the first switch set.

12. The transfer switch panel of claim 11 further comprising an enclosed housing that surrounds the neutral bus, the pair of hot buses, the first switch set, the second switch set and the bonded connection between the neutral bus and ground.

13. The transfer switch panel of claim 11 wherein the first switch set and the second switch set form part of a transfer switch contained within the transfer switch panel.

\* \* \* \* \*